United States Patent [19]

Kageyama et al.

[11] Patent Number: 4,870,920
[45] Date of Patent: Oct. 3, 1989

[54] PROCESS OF SMOOTHING A COATED-LAYER AND THE APPARATUS FOR USE IN SUCH METHOD

[75] Inventors: Takashi Kageyama, Hino; Makoto Yoshida, Nagashiyama, both of Japan

[73] Assignee: Konishiroku Photo Industry Co., Ltd., Tokyo, Japan

[21] Appl. No.: 97,326

[22] Filed: Sep. 11, 1987

Related U.S. Application Data

[60] Division of Ser. No. 910,851, Sep. 24, 1986, abandoned, which is a continuation of Ser. No. 815,290, Dec. 30, 1985, abandoned, which is a continuation of Ser. No. 662,893, Oct. 19, 1984, abandoned.

[30] Foreign Application Priority Data

Oct. 22, 1983 [JP] Japan ................................ 58-197914

[51] Int. Cl.[4] ............................................. B05C 11/02
[52] U.S. Cl. .................................... 118/103; 118/102; 118/120; 118/123
[58] Field of Search ................ 118/103, 123, 120, 102

[56] References Cited

U.S. PATENT DOCUMENTS

| | | | |
|---|---|---|---|
| 1,763,363 | 6/1930 | Moller | 118/120 |
| 1,956,562 | 5/1934 | Coates | 118/103 |
| 2,066,780 | 1/1937 | Holt | 118/102 X |
| 2,163,712 | 6/1939 | Shearer | 118/123 X |
| 2,929,735 | 3/1960 | Field et al. | 427/278 X |
| 2,998,332 | 8/1961 | Osdal | 427/286 X |
| 3,145,468 | 8/1964 | Johnson | 427/278 |
| 3,336,151 | 8/1967 | Shirley et al. | 427/286 |
| 4,277,301 | 7/1981 | McIntyre et al. | 427/286 |

Primary Examiner—Shrive Beck
Assistant Examiner—Alain Bashore
Attorney, Agent, or Firm—Finnegan, Henderson, Farabow, Garrett & Dunner

[57] ABSTRACT

A bar with two surfaces, a first that unifies, and a second to smooth a layer of liquid coating on a support transported past the bar. Recessed grooves of different types are present on the bar to unify the coating layer.

12 Claims, 6 Drawing Sheets

(a)

(b)

(c)

(d)

(a)    (b)

# PROCESS OF SMOOTHING A COATED-LAYER AND THE APPARATUS FOR USE IN SUCH METHOD

This application is a division of application Ser. No. 910,851, filed Sept. 24, 1986 which is a continuation of Ser. No. 815,290 filed Dec. 30, 1985 which is a continuation of Ser. No. 662,893 filed Oct. 19, 1984, all are now abandoned.

BACKGROUND OF THE INVENTION

1. Field of the Invention

This invention relates to a process of smoothing a coated-layer formed on a support and the apparatus for use in such process and, for example, to a process suitable for smoothing a magnetic coated-layer of a magnetic recording medium immediately after it is coated, and the apparatus for use in such process.

2. Description of the Prior Art

Heretofore, in the manufacture of magnetic recording media and the like, there have been proposed the process for smoothing surfaces in which a continuously travelling flexible support is coated with a coating liquid in a variety of coating processes and the surface of the coated-layer is smoothed in one of the various smoothing processes while the coated-layer still remains wet (normally, immediately after coating).

There are well known processes including, for example, such a process using a flexible sheet as disclosed in Japanese Patent Publication Open to Public Inspection (hereinafter called Japanese Patent O.P.I. Publication) No. 22835/1975; such a process using a bar shaped stiff member having a smooth surface called a smoothing bar or such a process using a deformable plate-shaped stiff member having a smooth surface called a smoothing blade as disclosed in Japanese Patent O.P.I. Publication No. 8646/1979; and further such a process using a combination of the described flexible sheet and a bar as disclosed in Japanese Utility Model O.P.I. Publication No. 6008/1980. In any one of these processes, however, the effect of smoothing a coated-layer is not satisfactory. For example, it is difficult to prevent a longitudinal streak caused in the travelling direction of a support, i.e., an irregular thickness in the width direction of a support, when a magnetic paint is coated on the support; and it is also difficult to prevent such fine streaks like the fine grains of a lauan lumber which are caused by a supply of the coating liquid with the supply thereof being reduced closely to an amount required to coat on. Resultantly, these difficulties will bring about such a deterioration of the characteristics of a magnetic recording medium as a lowering of the electromagnetic output, an increase in the drop-out and the like. It may be able to estimate that these troubles may be caused by well known smoothing processes in which a coated-layer is smoothed only in the travelling direction of a support.

The abovementioned Japanese Utility Model O.P.I. Publication No. 6008/1980 discloses that a bar provided with a flexible sheet is reciprocated in the direction perpendicularly intersecting to the travelling direction of a support. It may be presumable, by and large, to obtain an effect that a longitudinal streak on a coated-layer may be dispersed in the width direction and then eliminated thereby. To be more concrete, a flexible sheet for smoothing the surface of the coated-layer is reciprocated in its entirety and thereby the components of a coating liquid are moved forcibly in the width direction and are then smoothed, at the same time and under the same conditions, by the pressure of the sheet. In this process, however, the film-like sheet is still reciprocated constantly. It is, therefore difficult to smooth the surface of the coated-layer without fail. In other words, the components of a coating liquid are being held constantly moved in the width direction of a support by the reciprocation movement of a sheet and at the same time the moving coating liquid is separated from the sheet, therefore, all the reciprocation stress cannot forcibly be eliminated and the remaining stress is kept in the coating liquid. Resultantly, the remaining stress will cause an irregular thickness of the coated-layer. Streaks are also caused by a wrinkled sheet. In addition, a complicated driving mechanism must be provided for vibrating the entire flexible sheet and such vibrations are transmitted to a coating device, so that there may be some instances where a coating failure may be brought about. Further, because of using a sheet-shaped smoothing means, there may be troublesome in handling and installing the means, and still further air may be dragged between a sheet and a coated-layer when processing at a high speed, so that there may be a fear of coating in irregular thickness.

OBJECTS AND SUMMARY OF THE INVENTION

It is an object of the invention to provide a process of fully smoothing a coated-layer.

Another object of the invention is to provide an apparatus capable of surely and readily smoothing a coated-layer.

Therefore, this invention relates to a process of smoothing a coated-layer, wherein a coating liquid coated on a support is made to flow in the direction intersecting the travelling direction of the abovementioned support, and the coated-layer is then smoothed by means of a smooth surface.

The invention is also to provide an apparatus for smoothing a coated-layer, which is to serve as an apparatus capable of effectively performing the abovementioned process, wherein a contact surface brought into contact with a coating liquid coated on a support, such contact surface comprises a grooved surface and a smooth surface.

BRIEF DESCRIPTION OF THE DRAWINGS

Every drawing from FIG. 1 through FIG. 12 illustrates the respective examples of the invention.

DESCRIPTION OF THE PREFERRED EMBODIMENTS

The invention will be more detailedly illustrated by the following examples.

Figure 1:
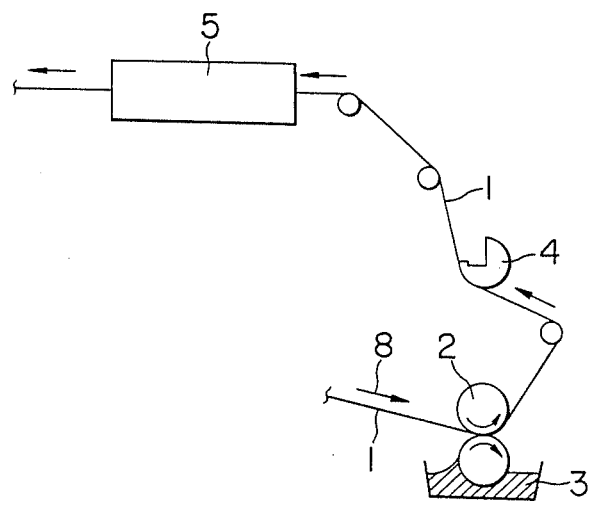
FIG. 1 is a schematic illustration of a magnetic tape manufacturing process.
Figure 2:
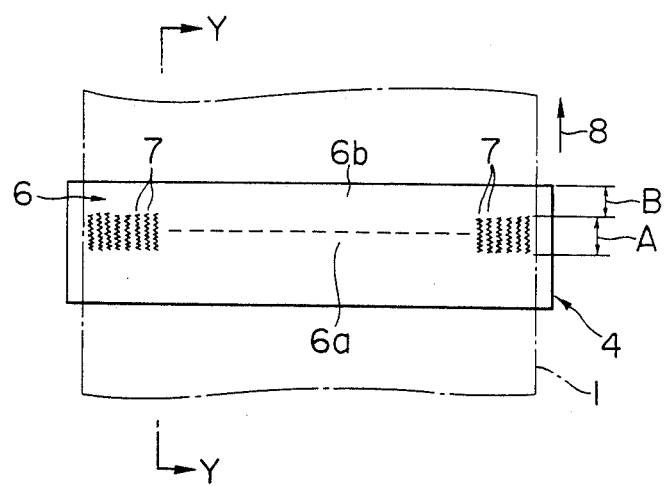
FIG. 2 is a front view of a smoothing bar.

Referring first to FIG. 1, a process of the example shown in this drawing such as a magnetic tape manufacturing process will schematically be described.

Immediately after a flexible support 1 drawn out of a driving roller (not shown) is coated with magnetic paint 3 by means of roll-coater 2 of, for example, gravure-coat type, it is fed to smoothing bar 4 while the coated-layer is still wet so that the coated-layer is smoothed thereby, and it is then dried up through dryer 5. It is however allowed to follow the conventional processes in which magnetic powder inside the coated-layer is oriented between smoothing bar 4 and dryer 5, or is calendered after passing dryer 5.

It is worth notice that smoothing bar 4 is so constructed as illustrated in FIGS. 2 through 5, respectively.

To be more concrete, in smoothing bar 4, its length contains the width of support 1 and its shaft is provided in fixed position to support 1 on traveling, and there are provided onto circular-arc-shaped contact surface 6 coming into contact with the coated-layer on support 1 with both of a surface 6a having a plurality of zigzag shaped grooves 7 on the side of incoming support 1 and along the traveling direction of support 1 and a smooth surface 6b on the down stream side of surface 6a both of which are adjacent to each other. Surface 6a having grooves 7 is provided over to area A on the circumferential surface of bar 4 and is extended from the vicinity of the position where the coated-layer of support 1 will come first into contact with the circumferential surface of bar 4 in area 10 of incoming support 1. And, smooth surface 6b is so provided as to be adjacent to surface 6a on the down stream side and is extended to area B on the circumferential surface of bar 4.

Figure 4:
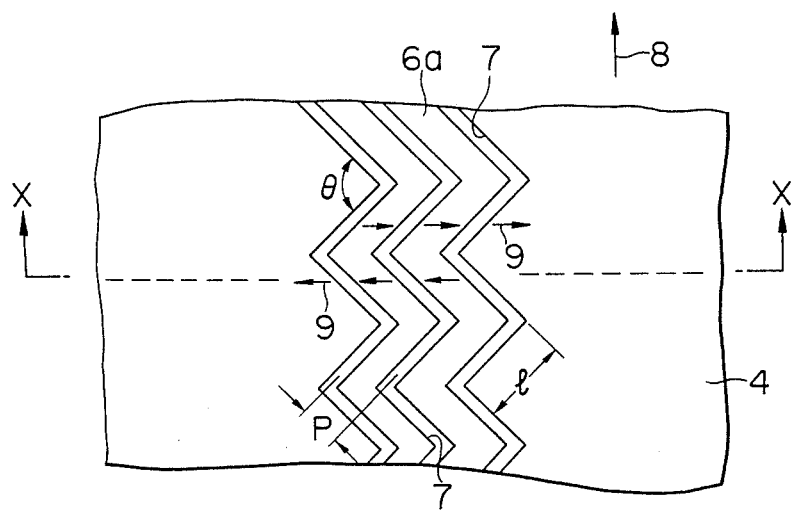
FIG. 4 is an enlarged plan view of the grooves of the smoothing bar shown in FIG. 2.
Figure 5:
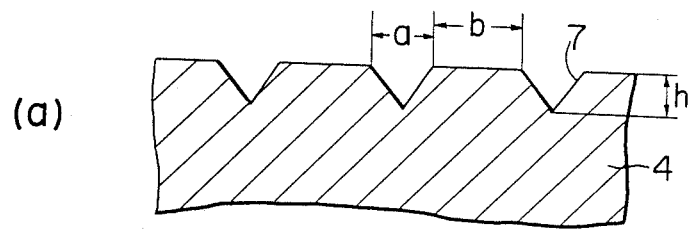
FIGS. 5(*a*), 5(*b*), 5(*c*) and 5(*d*) are the section views showing respectively the smoothing bars each having the grooves in a different configuration.
Figure 5:
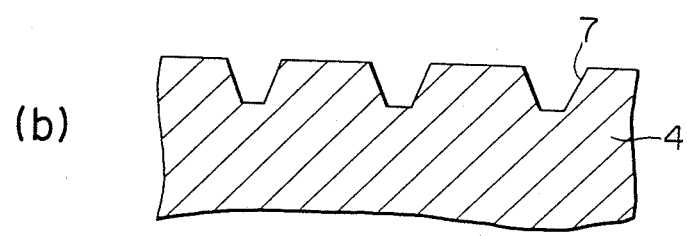
Figure 5:
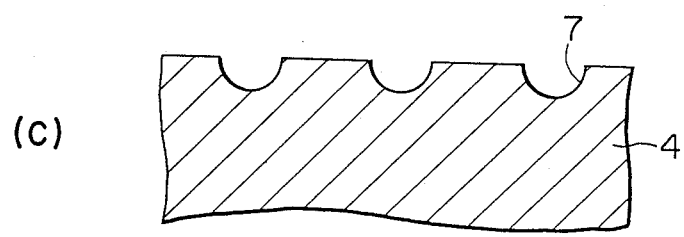
Figure 5:
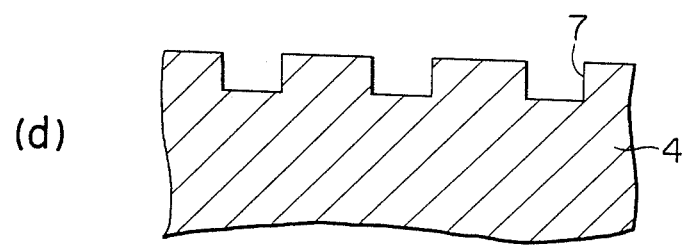

Grooves 7 may be formed in a plane pattern as shown in FIG. 4 or in a variety of sectional configurations as shown in FIG. 5. In other words, on a plane, each of grooves 7 is formed zigzag in about the same width and pitch and is, on the whole, along the travelling direction of a support, and each of them may have anyone of a variety of cross sectional configurations such as an inverted triangular form, an inverted trapezoidal form, a semicircular form, a rectangular form and the like. Each overall length of areas A and B in the travelling direction of the support may suitably be selected according to a travelling speed, a coated thickness, the physical properties of a coating liquid and the like and may be effective if the lengths of them are in the range of from 5 mm to 100 mm, respectively.

When using smoothing bar 4 having such grooves 7 in the area of an incoming support 1, a coated-layer still being wet on support 1 flows in grooves 7 and then slides on the abovementioned surface 6a. Since grooves 7 are formed zigzag to the travelling direction of the support, the liquid component of the coated-layer is at this time in a state where it has a speed component in the travelling direction as well as a speed component in the width direction of the support generated by its flux in grooves 7. Resultantly, as shown in FIG. 4, the coating liquid is made flow from side to side alternatively in the passages along the zigzag grooves 7 in area A, so that there can satisfactorily be unified and eliminated in this course the aforementioned longitudinal streaks and irregular thickness caused when coating.

As described above, the coating liquid is unified and immediately after then, it enters into smooth surface 6b of area B. On the surface 6b, the coated-layer is satisfactorily smoothed and is then separated from bar 4, as it is in a flat and smooth state. In this process, as described above, it is particularly essential that such a coating liquid shall be unified in the width direction in area A and it is then smoothed in area B. The reason why it is essential is that the coating liquid is once made flow satisfactorily in area A in the width direction and the stress caused by the flow still remains at this point of time and in the next area B the stress is forced to be eliminated and a shearing force is produced in the travelling direction 8 by smooth surface 6b so as to finish the surface to be completely flat and smooth, so that it can be conveyed to the next step.

And, from the structural viewpoint, it is possible to make the described coating liquid flow in the width direction and smooth solely by fixedly arranging a piece of smoothing bar 4. Therefore, there can be simplified in structure and can also be decreased in quantity of air taken in area 10 of incoming support 1 in contrast with the aforementioned flexible sheet that is apt to take air in area 10, so that this can greatly be useful in the case of processing at a high speed in particular.

Further referring to FIGS. 4 and 5(a), it is desired to arrange each of the abovementioned grooves 7 as described below;

Hooked angle $\theta = 20°-140°$ (preferably, $60°-110°$)

Pitch $p = 0.5$ 5 mm

Length of each side $l = 1-20$ mm (preferably, 3-10 mm)

Width $a = 0.1-5$ mm

Space $b = 0.1-10$ mm

Depth $h = 0.1-2$ mm

It is, however, allowed that a pitch p or space b is not always regularly arranged but may be irregularly arranged within the range mentioned above. It is also advisable that the depth of grooves 7 may be tapered as illustrated in FIGS. 5(a), 5(b) and 5(c).

The abovementioned smoothing bar 4 may be made of any one of a variety of materials such as stainless steel, iron, plastics and the like. Inter alia, those made of an ultrahard steel or those plated on the surface thereof with a hard chromium are advisable to use with the purpose of protecting an abrasion caused by using for a long period of time. Such grooves 7 may be formed in such a known method as a cutting process including an NC process, or a molding process in which a forming process is used.

Figure 6:
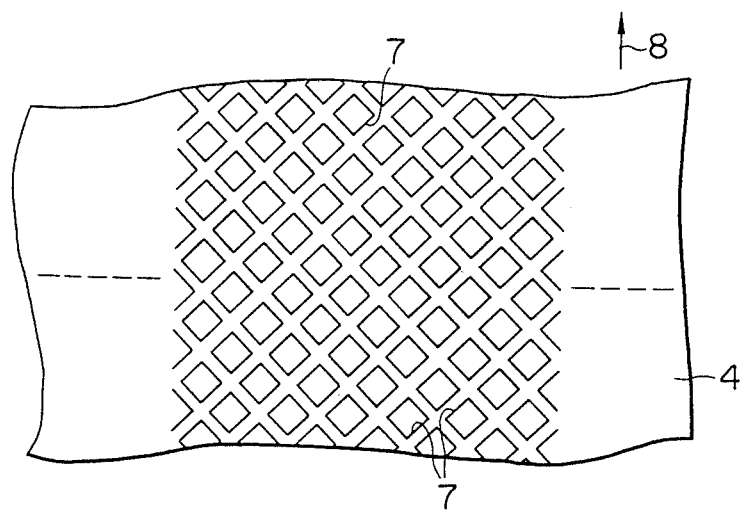
FIG. 6 is an enlarged plan view of other kind of grooves.
Figure 7:
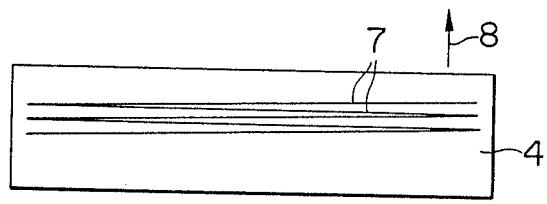
FIGS. 7 and 8 are the front views each illustrating a smoothing bar having grooves in further different configuration.
Figure 8:
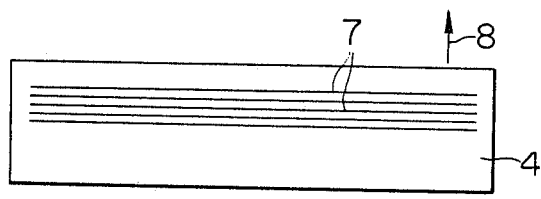

The effect of grooves 7 shall not be limited to the above but the same effect can be enjoyed also when a net-shaped or grid-shaped pattern is arranged as shown in FIG. 6. Or, as shown in FIG. 7, it is allowed to form a zigzag pattern extending slantly in the width direction of bar 4 or as shown in FIG. 8 it is also allowed to form grooves 7 simply in parallel with the width direction thereof. In the case of FIG. 8, a coating liquid is made flow directly along grooves 7 and in the width direction.

In addition, in the above given example, it is also allowed to smooth a coated-layer as bar 4 is held reciprocated in the direction of the shaft of bar 4, because the widthwise stress can be eliminated different from the case of using a film-like sheet. According to the above-mentioned reciprocation movement of bar 4, the phenomenon similar to the flow effect obtained by grooves 7 may be expected, therefore the pattern of grooves 7 may further be modified in this case. For example, it is also allowed that at least a portion of grooves 7 is intersected to the travelling direction 8 and the other portions are faced to the travelling direction 8, without intersecting all the grooves 7 to the travelling direction 8.

Next, the effects of smoothing bar 4 will be described especially in connection with its configurations.

Figure 9:
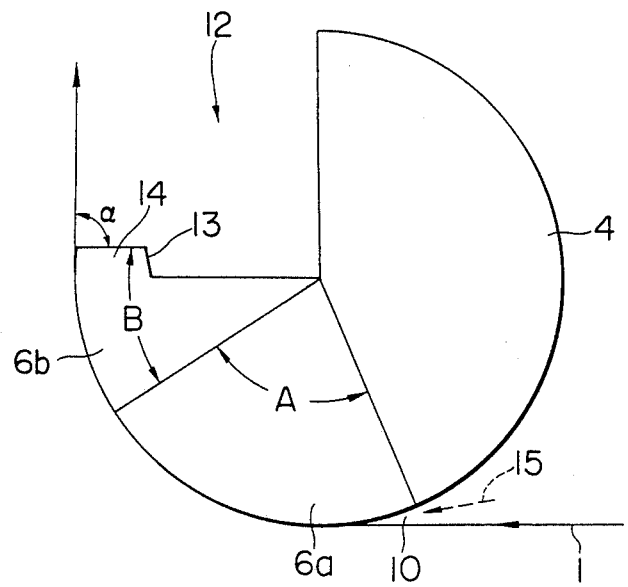
FIG. 9 is a side end view illustrating the size and angles of a smoothing bar.

As, illustrated in FIG. 9, from the viewpoint of that support 1 will separate from bar 4, it is desired that the support will travel in the tangential direction seeing from the direction of the shaft of the bar 4. If the support is closer to the bar than to the tangent, coating liquid 11 is apt to be scraped away. Support 1 may also be in a position slightly far from the tangent, however, if it is too far therefrom, there may be some instances where regularly pitched longitudinal streaks may be produced. When it is arranged approximately to the tangential direction, the abovementioned longitudinal streaks and scraping off may be prevented.

Bar 4 may be used if it has some curvature such as a circular sector or an elipsoidal sector, and it is advantageous from the viewpoint of manufacture that, as shown in FIG. 9, about a quarter of the full circumference is cut off and in the cut-off portion 12 a difference in level 13 is arranged to a position slightly closer to the center of the bar from the area coming into contact with support 1. In contrast with the above, if no difference in level 13 is arranged, a flat and smooth surface must be extended over to the whole area covered by the radius of the bar 4, because the cut-off surface and the surface of the bar must considerably be flat and smooth so as to separate a coated-layer surface from the bar smoothly. If this is the case, it is troublesome to polish such surfaces. On the other hand, if arranged as shown in FIG. 9, the arrangement may readily be achieved by smoothing only the upper surface of convex 14.

Figure 3:
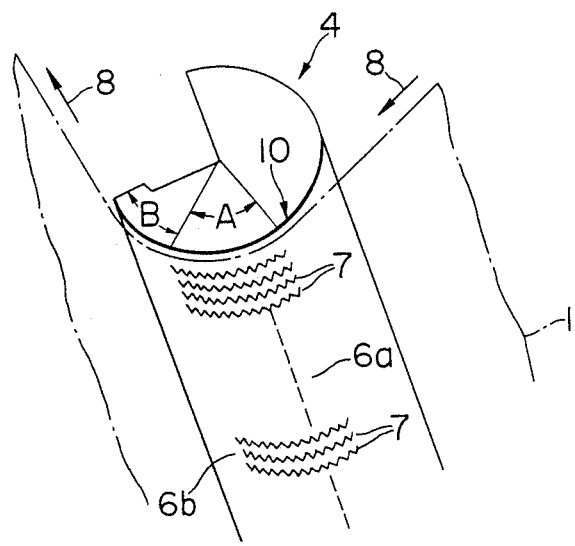
FIG. 3 is a perspective illustration of a part of the smoothing bar shown in FIG. 2.

In FIG. 9, when expanding area A of surface 6a to which the described grooves 7 are made and providing the area A from a position where is closer to this side (the upper stream), then the leading end of grooves 7 is on the side of further upper stream than in the example shown in FIG. 3, so that a greater effect may be enjoyed in preventing air from being taken in the gap between support 1 and bar 4, because air enters into the described grooves 7 and is stopped to flow about even if air is to be taken in the gap between support 1 and bar 4 as shown by a broken line in FIG. 9. This effect has not ever been expected from any conventional smoothing bars not having any groove and is very meaningful from the viewpoint of a high speed process in which an amount of air taken in the gap is generally increased. Therefore, a smoothing process can be carried out at a highly travelling speed and without any scattered thickness of a coated-layer caused by taking air in the gap between support 1 and bar 4.

Figure 10:
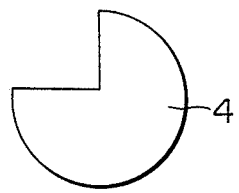
FIGS. 10(a) and 10(b) each is a side end view of another smoothing bar.
Figure 10:

Further, smoothing bar 4 may be in the form of a three-quarter circle or a half circle as shown in FIG. 10(a) and FIG. 10(b), respectively, and the curvature and configuration of the circumferential surface of bar 4 may also be changed variously.

Figure 11:
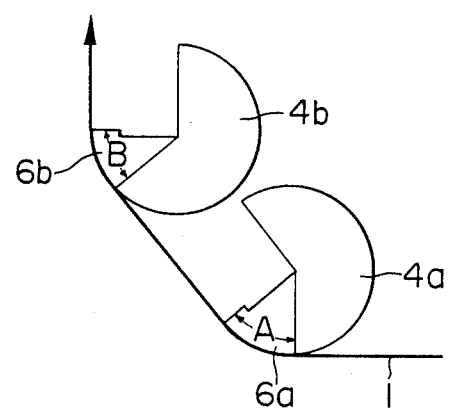
FIG. 11 is an illustration of the bars arranged in accordance with the other example.
Figure 12:
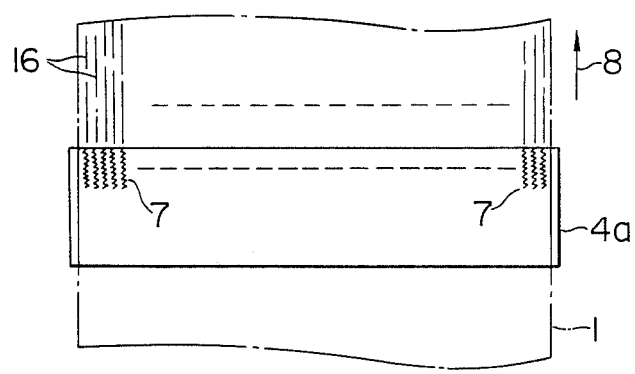
FIG. 12 is a front view of one of the bars.

FIGS. 11 and 12 illustrate the other examples, respectively.

In the aforegiven examples, surface 6a having grooves 7 and smooth surface 6b were provided to smoothing bar 4 itself. In the example shown in FIG. 11, two pieces of bars 4a, 4b were associated in pairs and bar 4a on the upper stream side is provided with surface 6a extending over to area A having grooves similar to the above and bar 4b on the down stream side is provided with smooth surface 6b only for smoothing a coated-layer, so as to extend over to area B. In this construction, it is also possible that a coating liquid is unified by bar 4a and is then completely smoothed by bar 4b.

However, bar 4a has grooves extended to the position from where support 1 is separated as shown in FIG. 12, so that there may be some instances where streaks 16 may be caused in some degree by the uneven trailing ends of grooves 7. These streaks 16 are of such an order that they may satisfactorily be eliminated in the process of smoothing a coating liquid by means of the secondary bar 4b, therefore they are harmless. In the case of the example shown in FIG. 3, however, grooves 7 as well as smooth surface 6b on the down stream side of the grooves must be provided.

Besides the abovementioned examples, a bar itself may be revolved to a support, or a driving system for smoothing may also be changed variously. Also, smoothing may be performed by any other types of members than a bar.

Next, referring to an experimental example for more complete understanding of the invention, wherein, this invention is applied to the manufacture of a magnetic tape, and it is to be understood that the invention can generally be applied to any other coating techniques.

At first, in an apparatus shown in FIG. 1, an operation was carried out under the following conditions:

Coating rollers 2: Gravure roller and rubber roll

Coating liquid 3: Magnetic paint having a well-known composition (for example, 100 parts by weight of Co-containing $\gamma$-$Fe_2O_3$, 6 parts by weight of vinyl chloride-vinyl acetate copolymer, 6 parts by weight of nitrocellulose, 12 parts by weight of polyurethane, 3 parts by weight of lecithin, 5 parts by weight of alumina, 5 parts by weight of carbon black, 100 parts by weight of cyclohexanone, 80 parts by weight of methyl ethyl ketone, and 50 parts by weight of toluene.)

Coating speed: 200 m/minute

Support 1: A polyethylene terephthalate film of 14 $\mu$m in thickness and 660 mm in width.

Smoothing bar 4: A stainless steel bar of 25 mm in radius of curvature.

Sizes of grooves 7: a=0.5 mm. b=1.0 mm, h=0.5 mm, p=1.5 mm, $\theta$=90°, l=5 mm.

Length of area A: 49 mm in the circumferential direction of the bar.

Length of area B: 20 mm in the circumferential direction of the bar.

When a smoothing was tried under the above listed conditions, a gravure pattern of the coating liquid caused by using rollers 2 was eliminated by providing grooves 7 and a satisfactorily flat and smooth surface was formed on the coated-layer. In contrast with the above, when bar 4 without having any groove 7 was used, the above mentioned gravure pattern still remained and any flat and smooth surface was not obtained.

On the other hand, in the abovementioned experimental example, a smoothing was tried in the same manner except that the following conditions were applied thereto:

Coating machine: An extrusion type coating machine.

Smoothing bar 4: A stainless steel bar of 20 mm in radius of curvature.

Sizes of grooves 7: a=0.5 mm, b 32 0.5 mm, h=0.3 mm, p=1 mm, $\theta$=100°, 1=5 mm.

Length of area A: 42 mm in the circumferential direction of the bar.

Length of area B: 20 mm in the circumferential direction of the bar.

Resultantly, there was not found on the coated-layer any lauan-grain like streak which used to cause when coating. When the bar not having the abovementioned grooves 7 was used, lauan-grain like longitudinal streaks of 0.03 to 0.06 mm in pitch and 2 to 6 mm in length each were produced over the whole surface. With the purpose of further evaluating the results obtained from this experimental example, magnetic tapes for videorecording and audiorecording use were produced respectively in the manner that a film was dried up by using a dryer after smoothing and the dried film was treated by a calender in an ordinary manner and was then slit.

When these magnetic tapes were measured, the data on their characteristics were obtained as shown in the table below.

The each method of measurements was as follows:

S/N:

Signals of 1 KHz were recorded as a tape by applying a prescribed bias current at a prescribed input level and the recording was then continued in the state that the signals of 1 KHz were cut off and after then both of the recordings were played back so as to measure the playback output level of the 1 KHz signals and the noise output level of the recording without applying signals. The difference between the output levels was represented by a dB. When the recordings were played back, a weighting network specified in JIS-C-5542-1971 (the magnetic recording tape testing method) was used to measure the playbacks.

Lumi-S/N:

White signals 50%, as the measuring signals, were recorded on a video tape and were then played back. The played back white signals were supplied to a "Shiba-Soku" Color Vidio Noise Measuring Instrument, Model 9250/1, and were then passed through each of the low-frequency cut-off filters of 1 KHz and 10 KHz so that the levels of the noise contained therein were read directly on a level meter.

Chroma-S/N:

Color signal of 100% superposing 702 signal of 0.714 Vp-p on a white signal of 0.36 Vp-p was recorded and then played back.

The amplitude modulation (AM) noise and phase modulation (PM) noise thereof were measured by using a by-pass filter for 10 KHz and a low-pass filter for 1 KHz.

RF Output:

When measuring the lumi-S/N, the FM output from the head was measured.

Chroma Output:

The output from the head was measured when the chroma-S/N was measured.

Frequency Response:

The playback levels of a 7 KHz signal and a 1 KHz signal each recorded on a test tape were measured with a prescribed bias current and at a recording level 10 dB lower than a prescribed audio level. Following the same procedure, the measurements were repeated with the referential tapes, respectively. The results of the measurements are expressed in terms of the difference between the test tapes each and a standard tape Sensitivity:

Measurements were made for the playback output signal levels of test tapes each recorded a 1 KHz signal by applying a prescribed recording current and a prescribed bias current. The ratio of the output from the standard tape to the output of 1 KHz from each test tape was represented by a dB.

Uniformity:

Output level fluctuations were expressed by the ratios of UV to dB obtained by measuring the whole length of each test tape recorded thereon a 1 KHz signal and 7 KHz signal, respectively, under the same conditions applied when the sensitivity of each tape was measured.

| | Smoothing bar | |
|---|---|---|
| Video Characteristics | No grooves | With grooves (This Invention) |
| Lumi-S/N | 1 KHz = 44.0[dB] | 44.4[dB] |
| | 10 KHz = 44.3[dB] | 44.6[dB] |
| Chroma-S/N | AM 1 KHz = 38.0 | 40.8 |
| | 10 KHz = 39.5 | 40.4 |
| | PM 1 KHz = 38.2 | 39.2 |
| | 10 KHz = 42.7 | 43.3 |
| RF Output | = −27.3[dBV] | −26.7[dBV] |
| Chroma Output | = −26.2 | −26.7 |
| Audio Characteristics | | |
| Frequency Response | 100 Hz = −2.6[dBV] | −2.5[dBV] |
| | 400 Hz = −0.3 | −0.2 |
| | 1000 Hz = 0.0 | 0.0 |
| | 5000 Hz = 1.5 | 1.5 |
| | 7000 Hz = 1.1 | 1.4 |
| | 10000 Hz = 0.8 | 1.7 |
| | 7000 Hz/1000 Hz = 1.1 | 1.4 |
| Sensitivity | 1000 Hz = −7.4 | −7.1 |
| | 7000 Hz = −6.2 | −5.5 |
| Uniformity | 1000 Hz = 1.14 | 0.13 |
| | 7000 Hz = 0.95 | 0.23 |
| S/N Signal Noise | = 52.9 | 53.8 |
| | = −7.0 | −6.6 |
| | = −59.9 | −60.4 |

As is obvious from the abovementioned data, in comparison with the longitudinally streaked tapes obtained by using the aforementioned smoothing bar without having groove, the tapes obtained by smoothing in accordance with the invention were high in chroma-S/N of 1 to 3 dB, RF output of 0.6 dB, frequency response of high potential (10 KHz) of 0.9 dB and uniformity of 0.7 to 1 dB, respectively. These excellent results can highly be rated because the surface characteristics of magnetic layer were greatly improved by this invention.

According to this invention, as described above, it is possible to eliminate the irregular thickness and streaks of a coated-layer because a coating solution is made flow in the intersectional direction to the travelling direction of a support. Further, it is possible to satisfactorily smooth the coated-layer without affected by the abovementioned flow of the coating solution because the coated-layer is finished flatly and smoothly after eliminating the abovementioned irregular thickness and streaks.

Still further, it is possible to embody a continuous smoothing process and an apparatus without making complicate, because there are provided to the smoothing device with the grooves (at least a part of the grooves is desired to orient to the direction inter-secting the travelling direction of the support) and the smooth surface for smoothing a coated-layer.

What is claimed is:

1. An apparatus for smoothing a layer of liquid coated on a support, the layer of liquid including areas of irregular thickness, the apparatus comprising:
    unifying means;
    smoothing means, said unifying means and said smoothing means being surfaces on a single bar;
    transport means for transporting the support in a first direction past said unifying means and said smoothing means;
    said unifying means for unifying the areas of irregular thickness by moving the areas of irregular thickness of the layer of liquid in a direction transverse to the first direction when the transport means transport the support past the unifying means; and
    said smoothing means for smoothing the unified coated layer when the transport means transports the support past the smoothing means.

2. An apparatus as claimed in claim 1 wherein the unifying means include a surface provided with recessed groove means for making the coated liquid flow generally in a direction other than the first direction.

3. An apparatus as claimed in claim 1, wherein the unifying means is positioned proximate to and upstream from the smoothing means.

4. An apparatus as claimed in claim 1, wherein the unifying means includes at least one groove means which extends in a direction lateral to the first direction for unifying the coated layer along a direction lateral to the first direction by flowing the coated layer across the support in a direction lateral to the first direction.

5. An apparatus as claimed in claim 4, wherein the groove means has a zig-zag configuration.

6. An apparatus as claimed in claim 4, wherein the groove means longitudinally extends uniformly at a right angle to the first direction.

7. An apparatus as claimed in claim 4, wherein said at least one groove means includes a plurality of edges forming a series of rows.

8. An apparatus as claimed in claim 1, wherein the bar longitudinally extends in a direction lateral to the first direction.

9. An apparatus as claimed in claim 1, including means for reciprocating the bar in the direction of its longitudinal extent and relative to the layer of liquid.

10. An apparatus for smoothing a layer of liquid coated on a support, the layer of liquid including areas of irregular thickness, the apparatus comprising:
    unifying means;
    smoothing means, said unifying means and said smoothing means being adjacent curved surfaces on a single bar;
    transport means for transporting the support in a first direction past said unifying means and said smoothing means;
    said unifying means for unifying the areas of irregular thickness by moving the areas of irregular thickness of the layer of liquid in a direction transverse to the first direction when the transport means transport the support past the unifying means; and
    said smoothing means for smoothing the unified coated layer when the transport means transports the support past the smoothing means.

11. An apparatus as claimed in claim 10, wherein the curved surfaces form a circular arc.

12. An apparatus as claimed in claim 10, including a plurality of said bars arranged in series.

* * * * *